United States Patent
Bravo et al.

(10) Patent No.: US 8,316,761 B2
(45) Date of Patent: Nov. 27, 2012

(54) APPARATUS FOR PRODUCING SO-CALLED SOFT ICE CREAM AND PROCESS FOR FEEDING A RELATIVE MIXTURE

(75) Inventors: Genesio Bravo, Alte Ceccato-Vicenza (IT); Stefano Bravo, Sovizzo-Vicenza (IT)

(73) Assignee: G.S.G. S.R.L., Vicenza (IT)

( * ) Notice: Subject to any disclaimer, the term of this patent is extended or adjusted under 35 U.S.C. 154(b) by 383 days.

(21) Appl. No.: 12/733,145

(22) PCT Filed: Aug. 29, 2007

(86) PCT No.: PCT/IB2007/002510
§ 371 (c)(1),
(2), (4) Date: Feb. 9, 2010

(87) PCT Pub. No.: WO2009/027757
PCT Pub. Date: Mar. 5, 2009

(65) Prior Publication Data
US 2010/0139500 A1  Jun. 10, 2010

(51) Int. Cl.
*A23C 3/04* (2006.01)
(52) U.S. Cl. ............. 99/455; 99/453; 366/76.8; 62/344
(58) Field of Classification Search .............. 99/453, 99/455; 62/337, 338, 339, 344; 165/94, 165/109.1; 366/76.8
See application file for complete search history.

(56) References Cited

U.S. PATENT DOCUMENTS

| | | | | |
|---|---|---|---|---|
| 3,227,095 A | * | 1/1966 | Thompson | 91/502 |
| 3,576,643 A | * | 4/1971 | Goodman | 426/2 |
| 3,858,498 A | | 1/1975 | Swenson | |
| 4,522,041 A | * | 6/1985 | Menzel | 62/342 |
| 5,916,248 A | * | 6/1999 | Bravo | 62/68 |
| RE36,390 E | * | 11/1999 | Fels et al. | 62/68 |

FOREIGN PATENT DOCUMENTS

DE    4433820 A1 *  3/1996

OTHER PUBLICATIONS

PCT Search Report dated Jul. 23, 2008.

* cited by examiner

*Primary Examiner* — Henry Yuen
*Assistant Examiner* — Jianying Atkisson
(74) *Attorney, Agent, or Firm* — Hedman & Costigan, P.C.; James V. Costigan

(57) ABSTRACT

Apparatus for producing so-called soft ice cream comprising a refrigerated feeding tank (12) for a liquid mixture (11) suitable for the preparation of soft ice cream, a group for pasteurising the mixture and a whipping cylinder (50). According to the invention, said group for pasteurising the mixture comprises a heating device (20) for an amount of mixture equal to at least one portion of product, a pre-cooling device (30, 30') for said amount of heated mixture and a storage tank (40, 40') for storing the pasteurised mixture at a constant temperature.

15 Claims, 5 Drawing Sheets

APPARATUS FOR PRODUCING SO-CALLED SOFT ICE CREAM AND PROCESS FOR FEEDING A RELATIVE MIXTURE

The present invention refers to an apparatus for producing so-called soft ice cream and to a process for feeding a relative mixture.

By soft ice cream we mean an ice cream where the air content is generally around 70%, but it can reach as high as 90%.

In machines for producing soft ice cream, in general, the preparation of the ice cream takes place with a discontinuous process, whereas the distribution of the ice cream is typically in portions, or single-servings. Such machines comprise a top tank for feeding and conserving the mixture already previously pasteurised with other means separate from the soft ice cream machine and a whipping cylinder.

Whipping is carried out in the cylinder at a temperature of about −35° C. to freeze the mixture in a very short time.

In some machines for producing soft ice cream defined as "Self-pasteurising" the whipping cylinder is fed discontinuously with the pasteurised mixture in the top tank; where it is also conserved, and it is possible during the day to make a refill of new mixture still however already previously pasteurised with other means separate from the soft ice cream machine. These soft ice cream machines have a heating system that when activated at the end of a working day sterilise the tanks, the cylinders with all of its content and perform the subsequent cooling to a conservation temperature of about +4° C.

In another type of machines for producing soft ice cream, like the one described and illustrated in European patent EP 818.151 B1, a single serving of mixture is taken from the conservation tank and heated. Then it is fed to a whipping cylinder equipped with a pre-cooling chamber, suitable for pre-cooling the single serving ending its pasteurisation process and therefore for cooling it, down to product the ice cream. In this second type of machine, the problem of the time taken to reload the feeding tank is solved, but the production of soft ice cream in the whipping cylinder is, in this case, strictly connected to the single serving heated and to the time taken to carry out such a process. Moreover, the pre-cooling of the single serving can pose problems of formation of a new bacterial load if it is not carried out sufficiently quickly. The time taken for cooling, amongst other things, also penalises the production time of a portion of ice cream. The described machines also have a complex operation in the coordination of the intervention of the individual devices.

The general purpose of the present invention is to overcome the aforementioned drawbacks of the prior art in an extremely simple, cost-effective and particularly functional way.

Another purpose is to make an apparatus and a process for feeding a relative mixture through which the mixture is fed to the whipping cylinder in the desired and pasteurised amount, in the correct manner, thus with its bacterial load much lower than the established standards.

In view of the aforementioned purposes, according to the present invention, it has been thought of to make an apparatus for producing so-called soft ice cream and a process for feeding a relative mixture, having the characteristics outlined in the attached claims.

The structural and functional characteristics of the present invention and its advantages compared to the prior art shall become clearer from an examination of the following description, referring to the attached drawings, which show an apparatus for producing so-called soft ice cream made according to the innovative principles of the invention itself.

In the drawings:

FIG. 1 shows a schematic view of a first embodiment of an apparatus for producing so-called soft ice cream of the present invention;

FIGS. 1A and 1B respectively show the apparatus of FIG. 1 while a pasteurisation cycle and a conservation cycle are being carried out;

Figure 1:
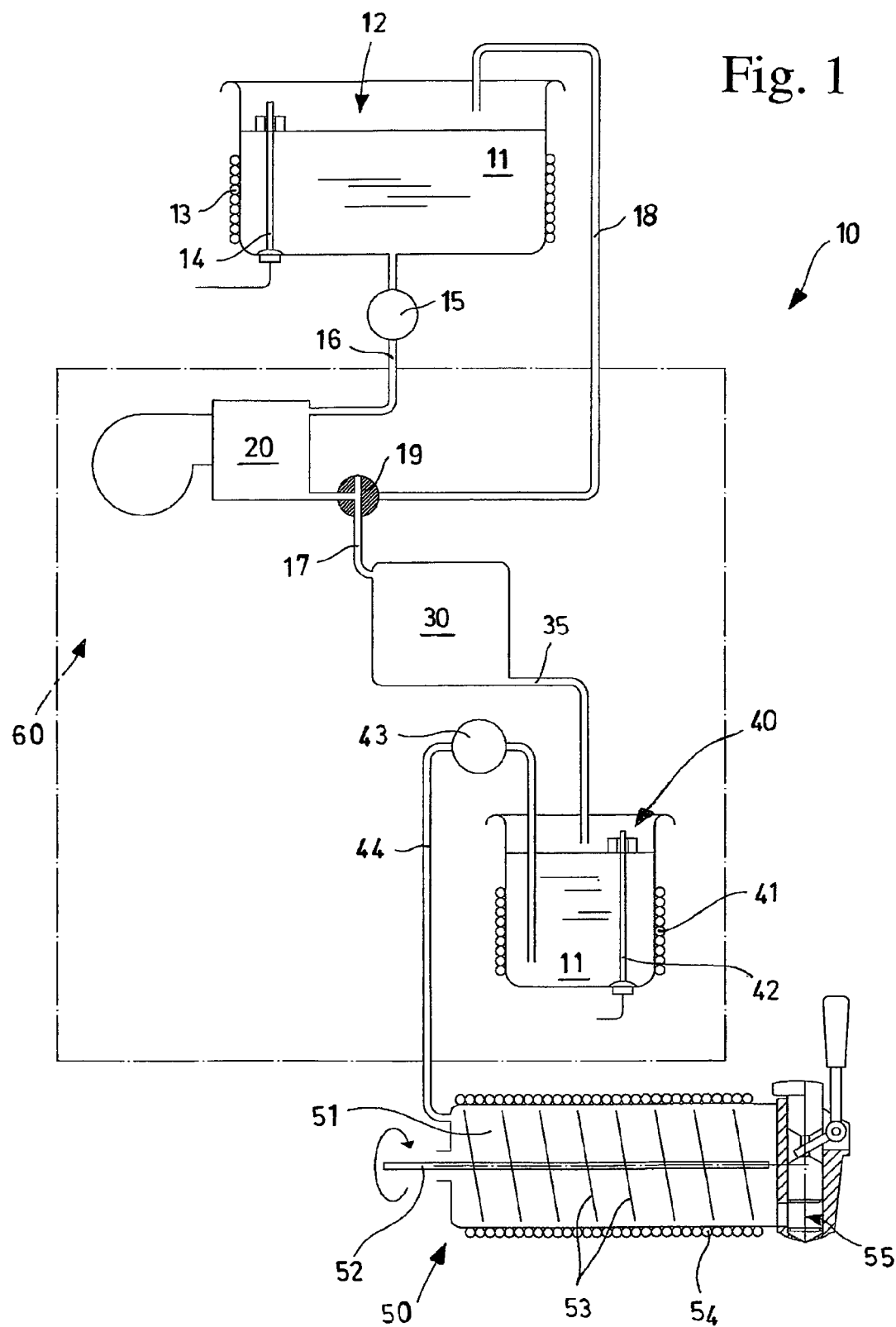

With reference to FIG. 1, an apparatus for producing so-called soft ice cream in object, according to a first embodiment is wholly indicated with 10, and in the illustrated example, according to the present invention, comprises a refrigerated tank 12 for feeding a liquid mixture 11, suitable for the preparation of soft ice cream, a group for pasteurising an amount of mixture equal to at least one portion of product, comprising a heating device 20, a pre-cooling device, or pre-cooler, 30 and a storage, or conservation, tank of the pasteurised mixture, as well as a product whipping cylinder 50.

The feeding tank 12 is provided with a cooling system 13, shown schematically, suitable for keeping the mixture 11 constantly at a relatively low positive temperature, for example around +4° C.

The tank 12 is also provided with a level indicator, or probe, 14, which allows it to be automatically determined when it is necessary to fill the tank 12 with new mixture 11.

The mixture 11 is taken through a pump 15 from the tank 12 and sent with a first duct 16 to the heating device 20.

The heating device 20, according to a preferred embodiment, comprises a microwave emitter that carries out rapid heating, i.e. in a few seconds, of an amount of mixture at least equal to a serving of product from a temperature of about +4° C. to a temperature of about +85° C.

The amount of mixture treated in the heating device 20 is transferred through a second duct 17 to the pre-cooling device 30 to end the pasteurisation process, taking the mixture back to a temperature of about +4° C., or at least below +8° C.

The pre-cooling device 30 constitutes a heat exchanger for liquid food mixtures and can for example be made according to different known configurations, such as a plated heat exchanger or a bladed mixer.

A preferred embodiment of the pre-cooling device 30 in an apparatus for producing so-called soft ice cream, object of the present invention, the heat exchanger comprises a cylindrical chamber 31 surrounded by heat exchange means 32 and a cylindrical rotor 33 having outer diameter substantially equal to the inner diameter of the cylindrical chamber 31 and carrying a helical recess, or groove 34 on the outer surface.

Figure 4:
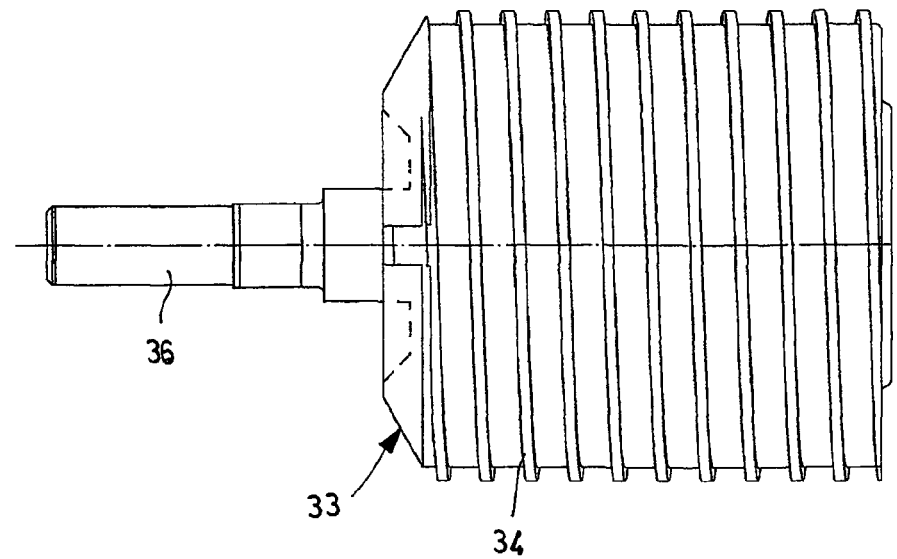
FIG. 4 shows the rotor of FIG. 3.

The helical recess 34 of the rotor 33, as shown in the detail of FIG. 4, at each point has a rectangular section to make, coupled with the cylindrical chamber 31, a spiral of liquid of rectangular section, in which one of the two longer sides is in direct contact with the wall of the cylindrical chamber 31 for the heat exchange.

Figure 3:
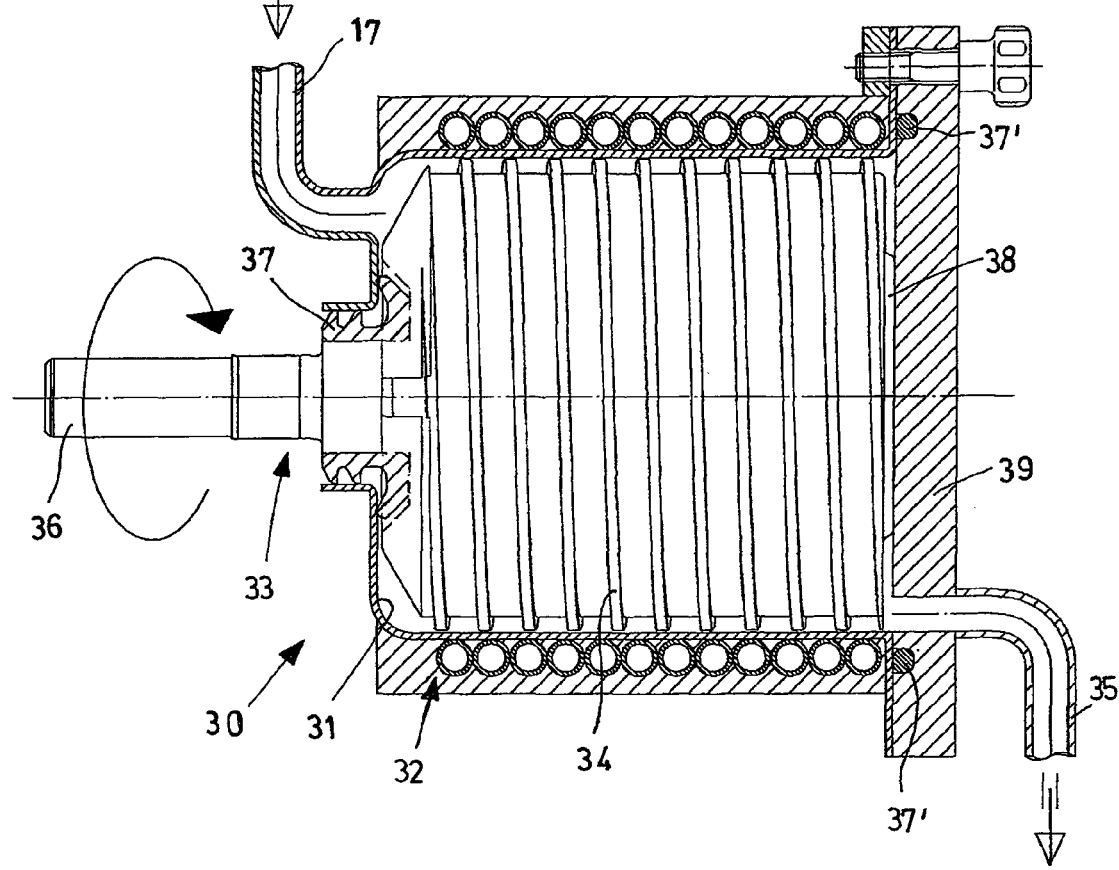
FIG. 3 shows, in an enlarged and partially sectioned detail, a pre-cooling device with a rotor for the apparatus object of the present invention.

The heat exchange means 32 consist of an evaporator comprising a coil for a refrigerant, surrounded by an insulating wall, as shown in FIG. 3.

The fluid spiral is placed in direct contact with the evaporator 32, the surface temperature of which is no greater than the freezing point of the liquid treated. This is to avoid the formation of ice in the recess 34 of the rotor 33.

In any case the rotary motion of the rotor 33 advantageously pushes the frozen liquid towards an outlet duct 35, breaking up the possible ice that has formed.

The helical recess 34 can, for example, be turned like a helix with short pitch on a bronze cylinder, suitable for use with food, or another compatible material, made as a hollow or full cylinder, according to requirements.

The selection of the size of the recess 34 depends upon the desired flow rate as well as the rotation speed of the rotor 33 so as to avoid a phenomenon of channeling hydraulic motion, in which there is only a part of the rotor 33 filled with liquid and the remaining part with air.

The length and the diameter of the rotor 33, on the other hand, are selected based upon the power that one wishes to dispense, these two variables being directly connected with the exchange surface.

The rotor 33 comprises a drive shaft 36 at one end, provided with an O-ring 37 that makes a rotary seal on the cylindrical chamber 31.

At the opposite end the rotor 33 comprises an abutment surface 38 against a closing flange 39 of the cylindrical chamber 31, which make the seal through gaskets 37'.

The duct 17 for the inlet of the liquid mixture into the heat exchanger device 30 is arranged at a first end of the cylindrical chamber 31, and in particular on top of it. The outlet duct 35, on the other hand, is arranged at the opposite end of the cylindrical chamber 31 in a base portion.

The fluid food mixture entered into the heat exchanger device 30 through the first duct 17, circulates in the gap that forms between the rotor 33 and the cylindrical chamber 31, where the heat exchange takes place. In the helical groove 34 the fluid takes on a spiral-shaped configuration with rectangular section, distinguished by a large heat exchange surface.

The pre-cooling device 30 takes the product just as quickly back to a temperature of about +4° C. carrying out a thermal shock so as to completely avoid the dangerous post-pasteurisation temperature range, +40° C.÷+20° C., in which the previously eliminated bacterial load can reappear.

Coming out from the pre-cooling device 30 an amount of pasteurised mixture flows through an outlet duct 35 towards the storage tank 40, which is suitable for containing an amount of pasteurised mixture equal to one or more portions of product, making a capacitor or reserve tank for the whipping cylinder 50.

The storage tank 40 comprises a temperature control system 41, shown schematically, which keeps the pasteurised mixture at a constant temperature of about +4° C. and a level indicator 42 all inside an airtight metal container 60.

From the storage tank 40 the pasteurised mixture, which is kept at a constant temperature of about +4° C., is conveyed through a duct 44 to the whipping cylinder 50 pushed by a pump 43, for example a gear pump, which also carries out the function of managing the so-called "overrun" of the mixture, i.e. of regulating the air percentage inside the soft ice cream, generally between 70% and 90%.

The whipping cylinder 50 is of the conventional type and comprises a whipping chamber 51 that houses a mixer 52 provided with a plurality of rotary blades 53. The whipping chamber 51 is surrounded by a cooling system 54, shown schematically, which keeps it at a temperature of about −35° C., as well as a dispensing group 55 of the soft ice cream.

Figure 1A:
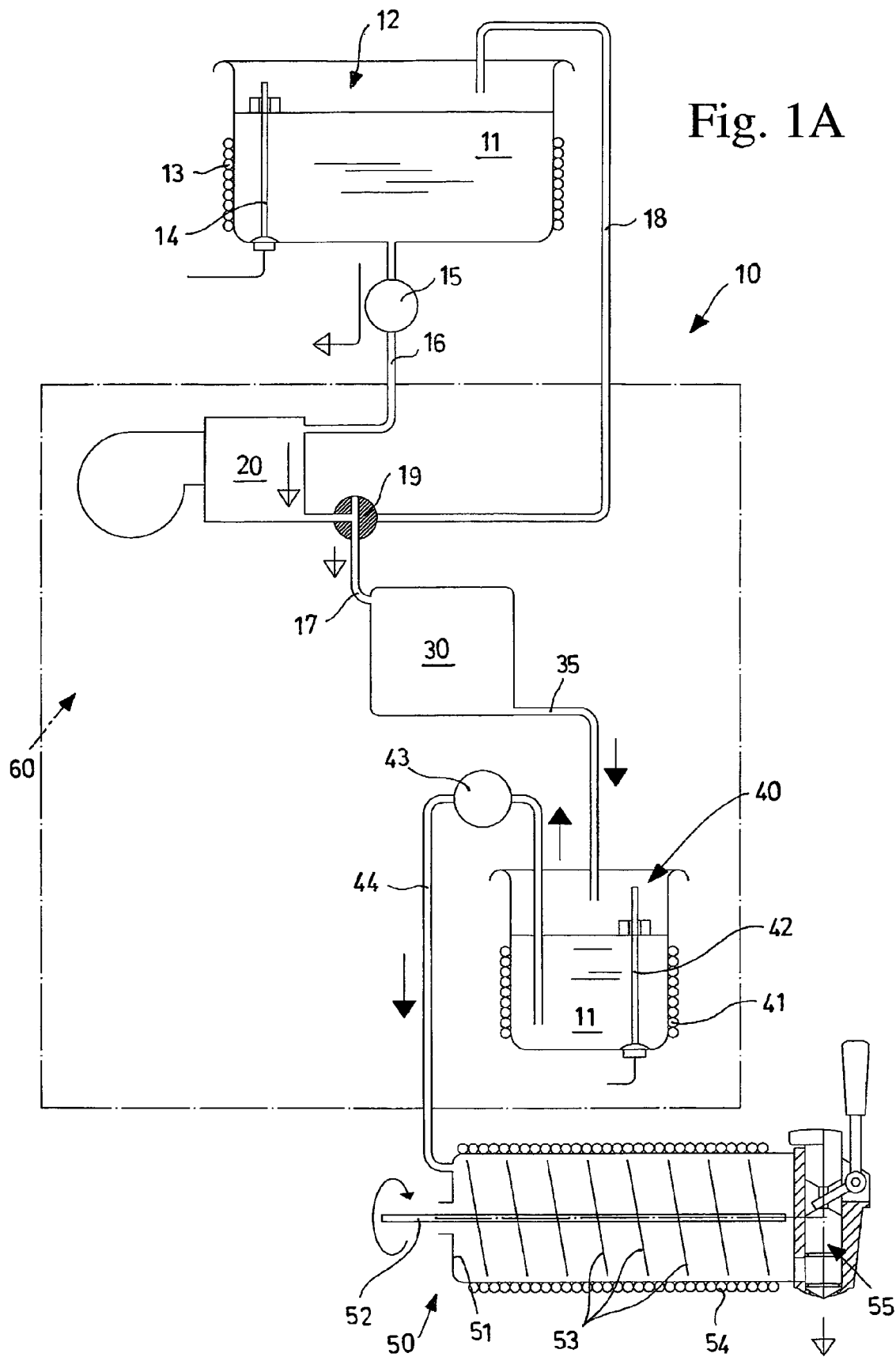

The apparatus for producing ice cream soft, object of the present invention, comprises a return circuit 18 between the heating device 20 and the tank 12 connected through a three-way valve 19 on the connection duct 17 between the heating device 20 and the pre-cooling device 30. FIG. 1A shows the valve 19 in exclusion position of the return circuit to carry out a normal pasteurisation cycle of the mixture, as shown schematically with the arrows.

Figure 1B:
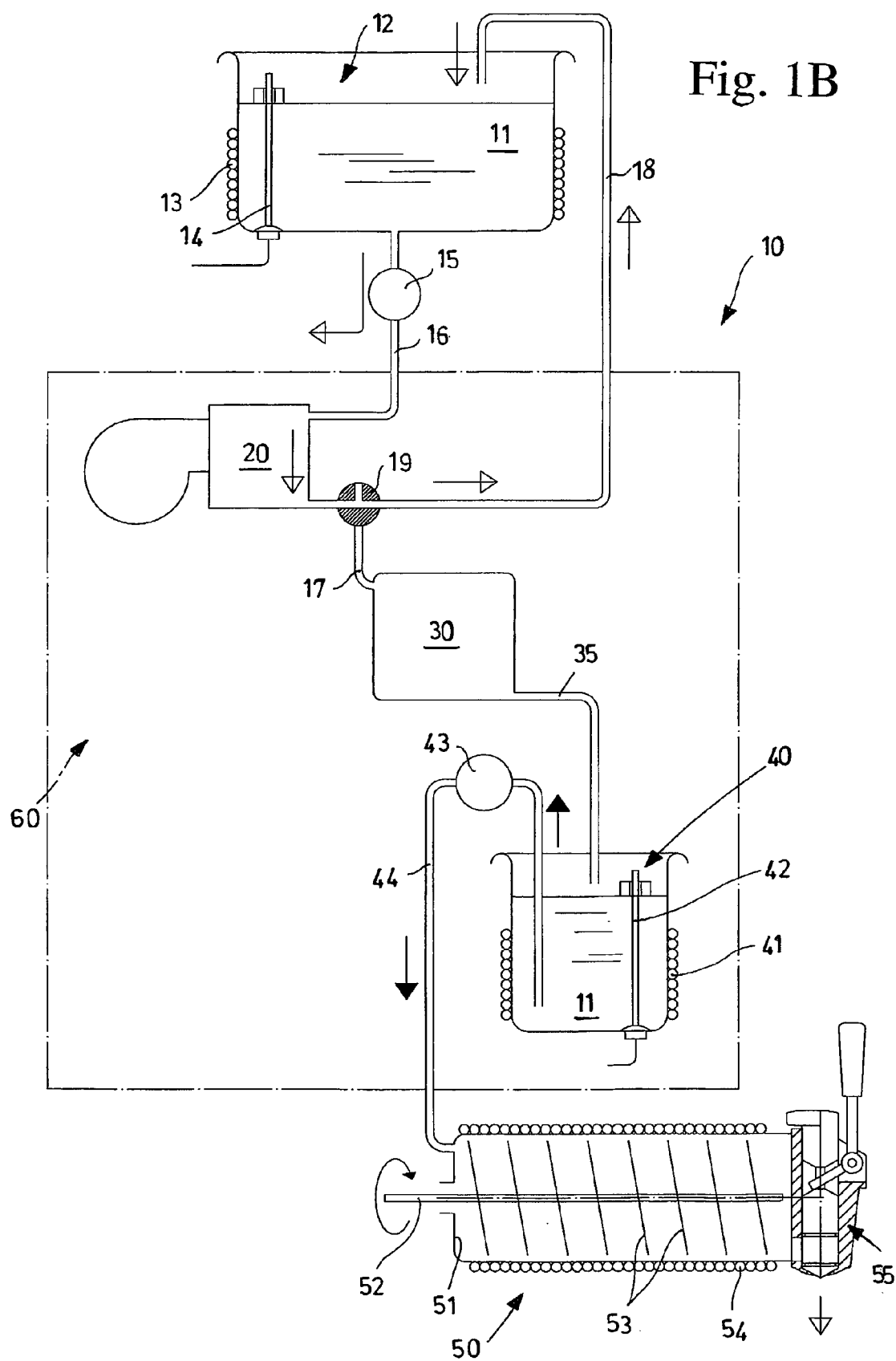

The return circuit 18 is used, with the valve 19 in the position shown in FIG. 1B, to carry out recycling of the product during the heating transition, as well as to carry out a cleaning cycle of the part that cannot be inspected of the apparatus with water heated to +95° C.

Moreover, during the dwell time the return circuit 18 is activated to carry out a conservation cycle and keep all of the components, even inside the heating device 20, at a safety temperature of below 8° C. to avoid bacterial contamination.

Moreover, FIG. 1B schematically shows, through arrows, how during the activation of the return circuit 18 the whipping can be carried out in the cylinder 50 taking the pasteurised mixture from the storage tank 40, which acts as a reserve tank.

The airtight metal container 60, schematised in the figures with a dotted and dashed line, is also provided with an opening equipped with an air filter, not shown, which encloses the heating device 20, the pre-cooling device 30 and the storage tank 40 of the pasteurised mixture. The container, as well as avoiding direct contact with the outside, further insulates from the danger of possible leakage of microwaves from the heating device 20 and in particular from the microwave emitter.

Figure 2:
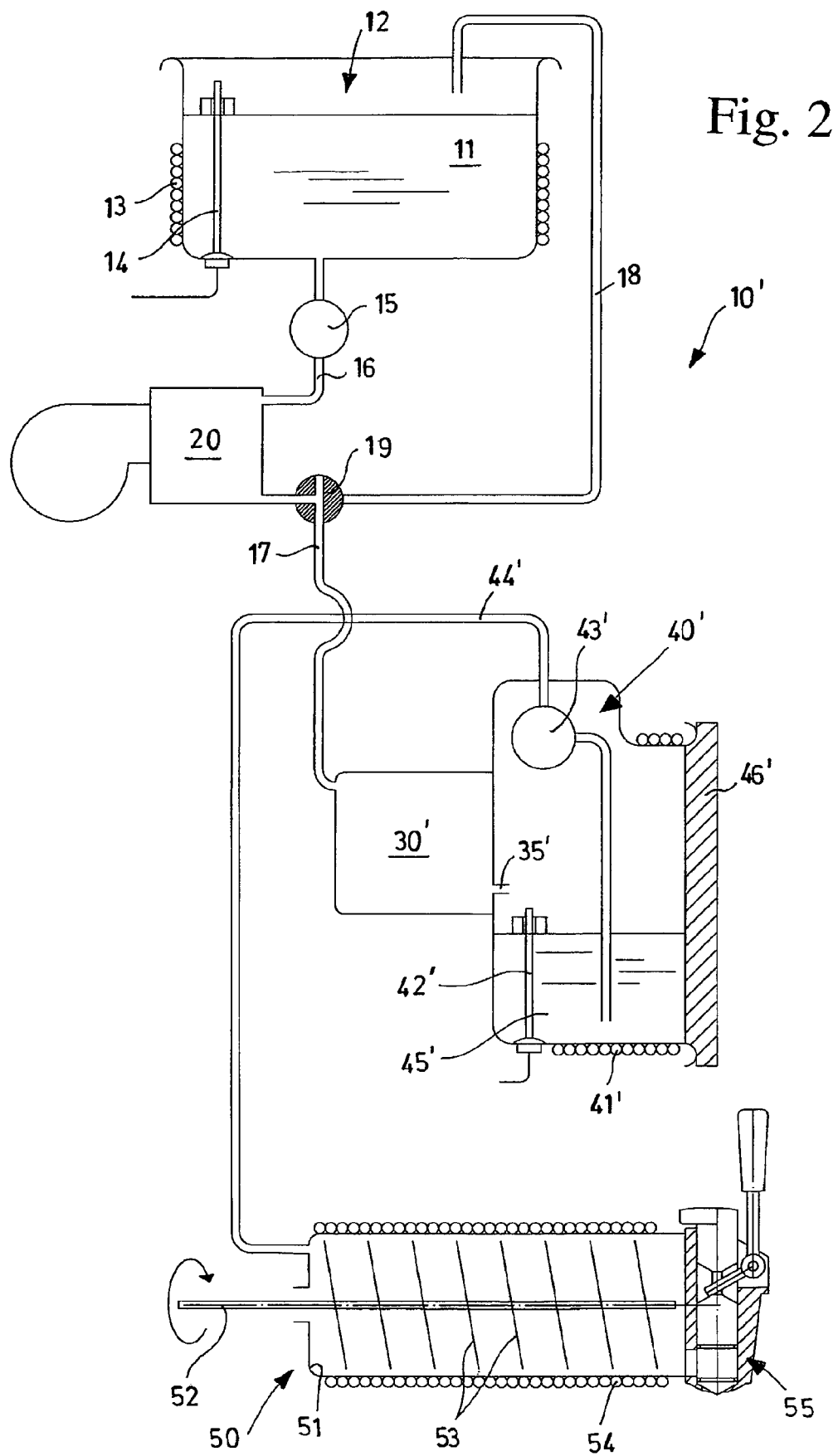
FIG. 2 shows a schematic view of a second embodiment of an apparatus for producing so-called soft ice cream of the present invention.

In a second embodiment of the apparatus for producing so-called soft ice cream, wholly indicated with 10' in FIG. 2, in the group for pasteurising an amount of mixture equal to at least one portion of product a pre-cooling device 30' and a storage or conservation tank 40' are integrated with each other.

In the example of FIG. 2, shown as a non-limiting example, the tank 40' comprises a cylindrical body 45' closed at the side with a flange 46'. An outlet 35' of the pre-cooler 30' directly leading onto a wall of the storage tank 40', also containing a pump 43' for feeding to the whipping cylinder 50 inside it. The tank 40' is also provided with a temperature control system 41' and with a level indicator 42', totally analogous to what has been described for the previous embodiment.

The further components of the apparatus 10', not expressly mentioned, also correspond to what has already been described for the first embodiment of the apparatus for producing soft ice cream 10.

In the apparatus for producing soft ice cream 10 or 10', object of the present invention, a mixture suitable for producing soft ice cream, and in particular an amount equal to at least one portion of product, is fed from the refrigerated tank 12, in which it is conserved at a temperature of about +4° C. to the microwave heating device 20, in which it is quickly heated to a temperature of about +85° C. The heated mixture is then fed in equal amount to the pre-cooling device 30 for rapid cooling to a temperature of about +4° C. The pasteurised mixture is then stored at substantially constant temperature equal to +4° C. in the tank 40 and fed to the whipping cylinder 50 in the desired amount equal to the production of a portion of product.

From what has been described above with reference to the figures, it is clear how a apparatus for producing so-called soft ice cream and a process for feeding a relative mixture according to the invention are particularly useful and advantageous. The purpose mentioned in the preamble of the description is thus achieved.

Of course, the shapes of the apparatus for producing so-called soft ice cream of the invention can be different from the one shown as a non-limiting example in the drawings, just as the materials can also be different.

The scope of protection of the invention is therefore defined by the attached claims.

The invention claimed is:

1. Apparatus for producing so-called soft ice cream comprising a refrigerated feeding tank (12) for a liquid mixture (11) suitable for the preparation of soft ice cream, a group for pasteurising the mixture and a whipping cylinder (50), characterised in that said group for pasteurising the mixture comprises a heating device (20) for providing an amount of heated mixture equal to at least one portion of product, where said heating device (20) is connected with a duct to a pre-cooling device (30, 30') for said amount of heated mixture, which in turn is connected with a duct to and a storage tank (40, 40') having a top side and a bottom side for storing the heated mixture at a constant temperature, wherein said pre-cooling device (30) comprises a cylindrical chamber (31), a heat exchange means positioned around the cylindrical chamber (32) and a cylindrical rotor (33) having an outer diameter substantially equal to the inner diameter of said cylindrical chamber (31), in which said rotor (33) carries a helical groove (34) that forms said liquid mixture into a spiral shaped configuration on the inner surface of cylindrical chamber (31).

2. Apparatus according to claim 1, characterised in that said heating device (20), said pre-cooling device (30) and said storage tank (40) are connected in series between said refrigerated feeding tank (12) and said whipping cylinder (50).

3. Apparatus according to claim 2, characterised in that said connection is through ducts (16, 17, 35, 44).

4. Apparatus according to claim 2, characterised in that said heating device (20) is connected through a duct (16, 17) respectively to said refrigerated feeding tank (12) and to a pre-cooling device (30') integrated with said storage tank (40'), in which an outlet (35') of said pre-cooling device (30') feeds directly into said storage tank (40').

5. Apparatus according to claim 1, characterised in that said heating device (20) comprises a microwave emitter for rapid heating of the mixture.

6. Apparatus according to claim 1, characterised in that said pre-cooling device (30) is a heat exchanger with large heat exchange surface for liquid food mixtures.

7. Apparatus according to claim 1, characterised in that said storage tank (40, 40'), suitable for containing a plurality of portions of product, comprises a temperature control system (41, 41').

8. Apparatus according to claim 7, characterised in that said storage tank (40, 40') comprises a pump (43, 43') for feeding said whipping cylinder (50) with a desired amount of mixture for producing a portion of soft ice cream.

9. Apparatus according to claim 7, characterised in that said storage tank (40') comprises a cylindrical body (45') closed at the top side with a flange (46').

10. Apparatus according to claim 1, characterised in that said apparatus comprises a return circuit (18) between said heating device (20) and said tank (12), said return circuit (18) being connected through a three-way valve (19) on a connection duct (17) between said heating device (20) and said pre-cooling device (30, 30').

11. Apparatus according to claim 1, characterised in that it comprises a metallic container (60) for said heating device (20), said pre-cooling device (30, 30') and said storage tank (40, 40') of the heated mixture.

12. Apparatus according to claim 1, characterised in that said heat exchange means (32) comprise a coil for a refrigerant.

13. Apparatus according to claim 1 characterised in that said helical recess (34) has a rectangular section.

14. Apparatus according to claim 1, characterised in that said rotor (33) is made from bronze.

15. Process for feeding a mixture (11) suitable for producing soft ice cream to a whipping cylinder (50) of an apparatus for producing soft ice cream, comprising:

feeding an amount of mixture equal to at least one portion of ice cream from a refrigerated tank (12) at a temperature of about +4° C. in succession first to a heating device (20) for rapid heating to a temperature of about +85° C. to form a pasteurised mixture; and then feeding said pasteurised mixture from the heating device to a pre-cooling device (30), wherein said pre-cooling device (30) comprises a cylindrical chamber (31); a heat exchange means (32) positioned around the cylindrical chamber, and a cylindrical rotor (33) having an outer diameter substantially equal to the inner diameter of said cylindrical chamber (31), in which said rotor (33) carries a helical groove (34) that forms said liquid mixture into a spiral shaped configuration on the inner surface of cylindrical chamber (31) for rapid cooling to a temperature of about +4° C.; and then feeding said pasteurised mixture from said pre-cooling device to a storage tank (40, 40') suitable for containing an amount of mixture equal to a plurality of portions of soft ice cream product; and storing said pasteurised mixture at constant temperature equal to about +4° C. in said storage tank (40, 40'); and then feeding said pasteurised mixture through a pump (43, 43') from said storage tank (40, 40') to said whipping cylinder (50) in an amount equal to a portion of a soft ice cream product.

* * * * *